United States Patent Office 3,338,849
Patented Aug. 29, 1967

3,338,849
INCORPORATION OF RECLAIMED RUBBER
INTO ASPHALT
Thomas A. Johnson, Lancaster, N.Y., assignor to U.S. Rubber Reclaiming Co., Inc., Vicksburg, Miss., a corporation of New York
No Drawing. Filed Aug. 14, 1964, Ser. No. 389,785
10 Claims. (Cl. 260—4)

This invention relates to processes of incorporating reclaimed rubber (either in the unrefined state in which it is often spoken of as "devulcanized rubber" or after refining) into asphalt, to the provision of compositions particularly adapted for such incorporation, and to the provision of asphaltic products having highly advantageous properties for use in paving roads, playgrounds and other surfaces, and for other purposes, and to other compositions for use therein and provided thereby.

The use of rubber in asphalt has many advantages for paving and other purposes, but raw rubber has proved too expensive for use in many instances. It has been found, however, that those particular properties of rubber which are important as an additive material for asphalt when used for paving and like purposes (e.g. an asphalt having a softening point (ASTM method D36–62T) of 100° F. to 230° F. and a penetration (ASTM method D5–61) of less than 200 mm. at 77° F. 100 g. 5 sec.) can often be provided substantially as well by reclaimed rubber as by raw rubber, and even that special advantages may be attained by the use of reclaimed rubber, provided that the reclaim is well dispersed in the asphalt; but this proviso has been a deterrent for the reason that reclaimed rubbers are normally much less readily dispersible in asphalt than are raw rubbers and normally require much higher temperatures for dispersion in the asphalt. Another material which has advantageously been incorporated in asphalt is polyethylene. It has been found, however, that when reclaimed rubber and polyethylene are supplied to an asphalt together in closely intermingled form—i.e. as a part of a substantially homogeneous composition—the dispersibility of the reclaimed rubber in the asphalt is materially increased so that it disperses in an asphalt at much lower temperatures with much less agitation or in a much shorter time than would be required for dispersing the reclaim in the asphalt if used by itself.

This may be due to mutual compatibility of polyethylene with the reclaim and the asphalt, and/or it may be that the presence of polyethylene spreads out the rubber network to such an extent that it permits the large asphalt molecules to enter the network and disperse the rubber.

However, there are limits beyond which the amount or percentage of polyethylene with respect to the reclaimed rubber and/or the total amount of the composition to be dispersed in the asphalt will actually retard some or all of the preferred procedures of dispersing the composition in the asphalt, as by imparting to the composition a "stickness" which interferes with the comminution thereof, since, other things being equal, the greater amount of comminution the greater the homogeneity of the composition, and the greater the homogeneity the greater ease in the final dispersion due to the absence of large particles which take longer to break down. While a substantially homogeneous composition may be obtained in other ways, it may, as a practical matter be best obtained by comminuting either the ingredients of the composition or the composition itself. In addition, a very high proportion of polyethylene may detract from or dilute the advantageous effects of the reclaimed rubber or have other undesirable effects.

Certain of the advantages of polyethylene, including an increase in dispersibility of reclaimed rubber, as well as other and different advantages, are obtained by use therewith of gilsonite (or other asphalt material having a high softening point and a low penetration). Here, again, the reasons are not fully known at present, though it may be that some of the reasons mentioned in connection with polyethylene are applicable, and though it is known that one advantage, among others, is due to a brittleness factor possessed by gilsonite and the like and imparted thereby to a composition which also contains reclaimed rubber, thus facilitating the provision of the composition or its ingredients in finely comminuted form. It has been found, however, that this very brittleness factor tends to cause a lowering of the impact resistance of an asphalt in which such a composition is dispersed; so that increase in the amount of gilsonite or the like in the composition soon reach a limit beyond which the end product is adversely affected in this respect. It has been found, moreover, that there also are limits beyond which the addition of gilsonite or the like will be harmful, as a practical matter, as in the penetration index of the asphalt in which the composition is dispersed.

In any event, the formation of the dispersion is greatly facilitated either by blending together the reclaimed rubber, the polyethylene, and the gilsonite (and any mineral powder or other ingredients) and then comminuting. Alternatively, in certain instances where the ingredients themselves can be satisfactorily provided in comminuted form, the ingredients so comminuted may be mixed to provide the composition for incorporation into asphalt.

The rate of dispersibility of a composition containing reclaimed rubber, polyethylene and a high-softening-point low-penetration asphaltic material (e.g. gilsonite) in asphalt is also enhanced by including in the composition one or more mineral powders, (e.g. whiting and/or anthracite coal dust).

The gilsonite, whiting, and coal dust further assist in making the reclaim smooth and in helping in the formation of a smooth blend of the polyethylene and the reclaim. These substances also assist in firming up the reclaim and giving it sufficient stiffness so that it or a composition containing it, can be reduced to fine particle size without sticking to or gumming up in normal size-reduction equipment. The whiting and coal dust may be replaced by other powdered mineral materials having similar physical properties, and the gilsonite by other asphalt-like materials having high softening points and low penetrations, such, for instance as "Gulf Pitch", an asphalt having a 365° F. softening point and a penetration of zero. The gilsonite or other hard, brittle asphaltic material used should have a ring and ball softening point (ASTM method D36–62T) of about 250° F. or more, and a penetration (ASTM method D5–61) less than 10 mm. at 77° F. Gilsonites (e.g. those set forth below) having softening points from 250° F. to 280° F. have given excellent results.

Scrap polyethylene is well adapted for use.

Polyethylenes having densities (specific gravities) of from 0.910 to 0.941 have been effectively used.

In most cases the amount of reclaimed rubber in the composition should run from 20% to 60%; of polyethylene from 12% to 50%, and preferably from 20% to 35% of the mix; of gilsonite (or other high-softening-point low-penetration asphalt) from 5% to 30%; of whiting 0% to 12.5%; and of coal dust from 0% to 15%. From 5 to 40 parts of mineral filler may desirably be used. The approximate ratio of reclaimed rubber to polyethylene should preferably range from 6:1 to 2:3; of reclaimed rubber to gilsonite 8:7 to 8:1; and polyethylene to gilsonite greater than 1:5. Best results are obtained when at least 12% of mineral powder is included.

Preferably the composition is formed into sheets on a two-roll refiner with one roll moving at a greater effective speed than the other and is then chopped into a flake, at least 90% of which should in most instances be not more than about 0.012 of an inch thick, and, for best results, between about 0.003 of an inch and 0.008 of an inch thick, and of any convenient size in its other dimensions. Other comminuted forms, e.g. powder, the minimum dimension of at least 90% of which is not over 0.012 of an inch may also be used.

The asphalt into which the composition is incorporated will ordinarily have a softening point of from 100° F. to 230° F. and a penetration of less than 200 mm. at 77° F. 100 g. 5 sec.; and, ordinarily, from 2½% to 40% of the composition will be homogeneously dispersed in from 97.5% to 60% thereof.

The following table is a compilation of numerous tests with various percentages of the above ingredients within the above ranges wherein the percentages of polyethylene in the composition and the ratio of devulcanized rubber to polyethylene, were as set forth below; and wherein "Comminuting" represents effective mechanical reduction to flaked or powdered form and wherein the "Dispersion" is determined by stirring 10% of the composition into 90% of 160–180° F. softening point asphalt for one hour at 400° F. and then visually examining a thin-spread film for particles—a visual "smoothness" indicating good dispersion and "fine grain" indicating the presence of some visibly undispersed fine particles of reclaimed rubber:

TABLE 1

| Percent of Polyethylene in Composition | Ratio of Reclaimed Rubber to Polyethylene | Comminuting | Dispersion |
|---|---|---|---|
| 18.2 | 2.38 | Good | Fine grain. |
| 20.0 | 2.00 | do | Smooth. |
| 24.5 | 1.63 | do | Do. |
| 26.0 | 1.54 | do | Do. |
| 30.0 | 1.33 | do | Do. |
| 38.1 | 1.13 | do | Fine grain. |
| 40.0 | 1.00 | do | Do. |
| 50.0 | 0.80 | do | Do. |

The following table indicates the importance of the presence of polyethylene and gilsonite and the desirability of the presence of mineral powder in assisting in the dispersion of reclaimed rubber in asphalt. As will be recognized, material in fine comminuted form will disperse more readily in asphalt than material which is so soft, flexible, and cohesive that is will tend to gather into or remain in the form of lumps; and the presence of polyethylene and the gilsonite, preferably with one or more of the suggested additional materials provides a mix with sufficient brittleness, separating qualities, and/or compatibility with asphalt that the reclaimed rubber can be utilized and/or maintained in powder or flaked form, or the like, and/or otherwise caused to disperse readily in asphalt:

TABLE 2

| | A | B | C | D | E | F | G | H | I |
|---|---|---|---|---|---|---|---|---|---|
| Parts by Weight: | | | | | | | | | |
| Devulcanized rubber | 40 | 40 | 40 | 40 | 40 | 40 | 40 | 40 | 40. |
| Scrap polyethylene | 24.5 | 26 | | 26 | 26 | 26 | 26 | 26 | 26. |
| Gilsonite | 15 | 16 | 15 | | | 16 | 16 | 16 | 16. |
| Whiting | 8 | 7 | 8 | | 7 | | 20.5 | 18 | 18. |
| Coal dust | 12.5 | 11 | 12.5 | | 11 | | | | |
| Qualities: | | | | | | | | | |
| Blending | Good | Good | Good | Good | Good | Good | Good | Good | Good. |
| Refining | do | do | Fair | do | do | do | do | do | Do. |
| Comminuting | do | do | Very poor | Fair | Sticky | Sticky | do | do | Do. |
| Dispersion 1 hour at 400° F | do | do | Poor | Poor | Poor | Good | do | do | Do. |

The various materials were of the character described in Example I (below), and treatments in columns A and C were those of Example I, and in columns B, D, E, F, G, H, and I were those of Example II (below). The dispersion data was obtained by agitating compositions consisting of 10% of the above compositions in 90% of 160–180° F. softening point asphalt at 400° F.

The following table points up the importance of polyethylene in the composition:

TABLE 3.—TIMES REQUIRED FOR GOOD DISPERSION OF 5% OF COMPOSITION IN 160–180° F. SOFTENING POINT ASPHALT

| Amounts: | | |
|---|---|---|
| Devulcanized rubber | 40 | 40. |
| Scrap polyethylene | 26 | |
| Gilsonite | 16 | 16. |
| Whiting | 7 | 7. |
| Coal Dust | 11 | 11. |
| Times: | | |
| At 300° F | 30 minutes | Over 6 hours. |
| At 350° F | 20 minutes | Do. |
| At 400° F | 10 minutes | Do. |

The following table points up the importance of the presence of both polyethylene and gilsonite in the composition:

TABLE 4

| | L | M | N | O | P | Q | R | S | T |
|---|---|---|---|---|---|---|---|---|---|
| Amounts: | | | | | | | | | |
| Devulcanized rubber | 40 | 40 | 40 | 40 | 40 | 0 | 40 | 40 | 40 |
| Scrap polyethylene | 42 | 28 | 14 | 0 | 26 | 0 | 35 | 21 | 7 |
| Gilsonite | 0 | 14 | 28 | 42 | 16 | 0 | 7 | 21 | 35 |
| Whiting | 7 | 7 | 7 | 7 | 7 | 0 | 7 | 7 | 7 |
| Coal Dust | 11 | 11 | 11 | 11 | 11 | 0 | 11 | 11 | 11 |
| Qualities: | | | | | | | | | |
| Time required to disperse 5% of composition in 85–100 pen. asphalt at 275° F., hr | 6 | 1 | ¾ | 1½ | 1 | | 1¼ | ¾ | ¾ |
| Impact resistance | 47 | 40 | 30 | 29 | 40–43 | 29 | 42 | 41 | 34 |
| Penetration index | +4.3 | +4 | +4 | +3 | +4 | +3 | +4.5 | +3.8 | +3.5 |

At 350° F. the compositions of columns L, M, O, and P all dispersed in 85–100 penetration asphalt in less than 10 minutes.

The dispersion figures of the above table were obtained by scraping the molten asphaltic compound along a groove of diminishing depth and determining if, when, and to what extent large particles drag to form spots in a groove-section of particular shallowness.

The impact resistance figures were determined at 32° F., using a weight of 375 grams dropped on samples from successively increasing heights until the first crack appeared in the sample when the weight was dropped from a given height listed in centimeters.

Penetration index was as defined in pages 166 and 167 of "The Properties of Asphaltic Bitumen" by J. Ph. Pfeiffer, Elsevier Publishing Co., Inc., 1950. The penetration index is a measure of the behavior of asphalt with change in temperature. Usually this refers to viscosity and associated properties. The higher the penetration index the better these properties are, e.g. the lower the change in viscosity with temperature.

Molecular weights as set forth herein are average molecular weights determined by measuring the kinematic viscosity in centistokes at 220° F. of a 5 weight percent solution of polyethylene in paraffin wax having melting point of 133–135° F., and calculating the molecular weight from the formula, $W = 721V - 1924$, where W is the average weight, and V is the 220° F. viscosity in centistokes.

Unless otherwise stated herein, parts, proportions, and percentages given are by weight.

EXAMPLE I

The following were mixed on a two-roll laboratory mill for five minutes at a temperature of from about 165° F. to about 230° F. (200° F. is preferable):

| | Parts |
|---|---|
| Devulcanized rubber | 40.0 |
| Scrap polyethylene | 24.5 |
| Gilsonite | 15.0 |
| Anthracite coal dust | 12.5 |
| Whiting | 8.0 | to provide a composition adapted for addition to asphalt.

The devulcanized rubber (unrefined reclaimed rubber) was prepared as described below, and the scrap polyethylene was cut from calendered sheets in pieces about ½″ in maximum dimension. This had a density (specific gravity) of about 0.925 and a molecular weight of about 17,500. The components were refined twice at 0.004″ on a laboratory refiner at a temperature of from about 165° F. to about 230° F. at which temperature the polyethylene will become fairly fluid. The sheets thus produced were cooled and then chopped into a flake about 0.004″ thick using a Fitzpatrick comminutor and screened to pass a 10-mesh screen.

90 parts of 85–100 penetration asphalt having a 120° F. softening point were heated to 300° F. while stirring with a propeller type agitator, whereupon 10 parts of the flaked composition was added as rapidly as it could be taken up by the asphalt, while the heating and agitation continued. Heating and agitation were thereafter continued until no particles of the flaked product were visible, which required about 45 minutes.

The devulcanized rubber was obtained by the use of a screw plasticator of the type set forth in Patent 3,051,990 to C. H. Peterson into which there was introduced 100 parts of minus 30-mesh fiber-free whole tire scrap which consisted of from 19% to 30% natural rubber and from 19% to 35% SBR; 2.88 parts of refined fuel oil #3; 3.60 parts of pine tar; 5.04 parts of the resinous byproduct of clay-treating petroleum products (CTLA 8804); 4.86 parts of a mixture of 30% solid asphalt, 30% tall oil pitch, and 40% petroleum solvent (3186–S2); 0.63 parts of mixed aryl disulfides; 0.375 of monoethanolamine; and 0.625 part of water which were processed at an oil temperature of 350° F. and a processing temperature between 350° F. and 400° F. at a processing time of 5 minutes.

The devulcanized rubber thus produced may then be treated as set forth in B. R. Wendrow Patent 2,767,149, using the whiting mentioned above.

The devulcanized rubber may, of course, be refined before introduction into the composition, if desired.

Some of the coal dust may be replaced by SRF black.

The entire composition dispersed readily in the asphalt.

In comparative tests the product of the 90 parts of asphalt and 10 parts of flaked composition gave a softening point of 133° F. as contrasted with 120° F. for the asphalt alone. A product similarly formed from 95 parts of the asphalt and 5 parts of the flaked composition gave a softening point of 124° F.; a product similarly formed from 85 parts of the asphalt and 15 parts of the flaked composition gave a softening point of 145° F.; and a product similarly formed from 80 parts of the asphalt and 20 parts of the flaked product gave a softening point of 152° F. Impact resistance was determined at 32° F., using a weight of 375 grams dropped on samples from successively increasing heights until the first crack appeared. The drop distance is reported below in centimeters (the percentages being that of the flaked product in the asphalt):

| Percentage: | Cm. |
|---|---|
| 0 | 27 |
| 5 | 35 |
| 10 | 47 |
| 15 | 57 |
| 20 | 67 |

For penetration at 77° F., 5 sec. at 100 g. the figures were:

| Percentage: | Mm. |
|---|---|
| 0 | 73 |
| 5 | 65 |
| 10 | 59 |
| 15 | 50 |
| 20 | 44 |

A paving mix containing 39% coarse roofers' sand, 50.5% plasterers' sand, 4.9% minus 200-mesh limestone and 5.3% asphalt and 0.3% of the composition of Example I showed, compared with a similar paving mix containing no rubber additive, better aggregate adhesion, better water resistance, and increased Marshall stability.

EXAMPLE II

The following were dry mixed for ten minutes in a paddle-type mixer and then mechanically mixed in an extruder type mixer (called a "Mil-strainer") with a forward screen of 8-mesh, and then passed thru a standard rubber strainer:

| | Lbs. |
|---|---|
| Devulcanized rubber | 200 |
| Ground scrap polyethylene (½″) | 130 |
| Gilsonite | 80 |
| Anthracite coal dust | 55 |
| Whiting | 35 |

The devulcanized rubber (unrefined reclaimed rubber) was reclaimed as in Example I employing minus 30-mesh fiber-free whole tire scrap which consisted of 65% passenger tire scrap containing from 19% to 30% natural rubber and from 19% to 35% SBR and 35% truck and bus tire scrap containing from 30% to 45% natural rubber and from 10% to 20% SBR. The polyethylene had a density of about 0.925 and a molecular weight of about 17,500. The mixed and strained composition was refined twice on a standard rubber refiner at a gage of 0.004. The resulting product was reduced to a flake or powder minus 10-mesh in size by passing the refined sheets thru a Fitzpatrick comminuter. Generally similarly good results were obtained as in Example I.

EXAMPLE III

Generally similarly good results were obtained using instead of the devulcanized rubber of Example II a pan process reclaim in which there were heated together 4½ hours at 400° F. in open steam) 95.5 parts of a composition comprising 100 parts of the whole tire fiber free rubber of Example I, 3.75 parts of dipentene, 2 parts of resinous by-product of clay-treating petroleum solvent (Enjay 905), 3.75 parts of meduim pine tar, 4.75 parts of 3186–S2 (see Example I), 0.25 part of aryl disulfide (Reclaimer 500), and 5 parts of water; 1 part of gilsonite; 3 parts of carbon black; 0.4 part of monoethanolamine; and 0.5 part of a saturated polymerized hydrocarbon (paraflux 2016).

EXAMPLE IV

Generally similarly good results were obtained using instead of the devulcanized rubber of Example II a pan process reclaim in which there were heated together for 5 hours at 363° F. in open steam 100 parts of minus ½-inch-mesh garment scrap rubber, 5 parts of high-boiling oil (LX 759 Provalent), 2 parts of light processing oil (Circo), 2 parts of resinous by-product of clay treating petroleum products (CTLA 8804), 1.2 parts of a 25% solution of sodium hydroxide in water, 5 parts of clay, and 2.1 parts of water.

EXAMPLE V

Generally similarly good results were obtained using instead of the devulcanized rubber of Example II a digester reclaim in which there were heated together in a digester for 5 hours at 388° F. 100 parts of whole tire scrap (as in Example II), 3 parts of dipentene, 3.5 parts of pine tar, 3.5 parts of a mixture of 30% solid asphalt, 30% tall oil pitch, and 40% petroleum solvent, 3.5 parts of resinous by-product of clay treating petroleum products, 0.5 part of aryl disulfide, 6 parts of NaOH, and 225 parts of water.

EXAMPLE VI

Similarly good results were obtained when there was substituted for the reclaim of Example V a similarly formed reclaim in which one part of $ZnCl_2$ was substituted for the 6 parts of NaOH in the formula of Example V.

EXAMPLE VII

Generally similarly good results were obtained when part or all of the devulcanized rubber of Example II was replaced by devulcanized butyl rubber. The butyl reclaim was formed by processing, similarly to the vulcanized rubber of Example I, one hundred parts of butyl tube stock, 2 parts of dipentene, 3 parts of light processing oil (Circo), 0.5 part of aryl disulfide, and one part of 25% sodium hydroxide solution.

EXAMPLE VII

Generally similarly good results were obtained when part or all of the whole tire devulcanized rubber of Example II was replaced by scrap vulcanized SBR similarly devulcanized.

When the mixes of the various preceding examples were dissolved in an asphalt as set forth in Example I, the latter showed in each case an improved low temperature fracture, an elevated softening point, increased viscosity, reduced temperature susceptibility as indicated by penetration index figures, increased resistance to flow displacement at elevated temperatures, and increased toughness (measured by the time and force required to pulling a partially submerged ball from treated asphalt).

EXAMPLE IX

Generally good results were obtained using the process of Example III, except that the polyethylene, the gilsonite, the whiting, and the coal dust of Example I were added to the whole tire scrap of Example I prior to subjecting it to open steam for 4½ hours at 400° F. with the other ingredients set forth in Example III to reclaim it.

EXAMPLE X

Generally similarly good results to those obtained in Example I were obtained when there were substituted for the scrap polyethylene of Example I a scrap polyethylene having a density of 0.922 of a molecular weight of 19,000.

EXAMPLE XI

Generally similarly good results were obtained when there was substituted a scrap polyethylene having a density of 0.925 and a molecular weight of 16,100.

EXAMPLE XII

Generally similarly good results were obtained when there was substituted a scrap polyethylene having a density of 0.922 and the molecular weight of 22,600.

EXAMPLE XIII

Generally similarly good results were obtained when there was substituted a virgin polyethylene having a density of 0.931 and molecular weight of 12,200.

EXAMPLE XIV

Generally similar good results were obtained when there was substituted a virgin polyethylene having a density of 0.918 and molecular weight of 20,000.

EXAMPLE XV

Good results were obtained using the composition of Example I, with the quantity of devulcanized rubber increased to 60 parts.

EXAMPLE XVI

Good results were obtained using, instead of the composition of Example I, a composition containing 20 parts of devulcanized rubber, 50 parts of scrap polyethylene, 50 parts of gilsonite, 5 parts of soda-treated rosin (having a melting point of 76° C. (ring and ball)); acid No. 107; saponification No. 136; unsaponified matter 22.5%.

EXAMPLE XVII

Good results were obtained with the composition of Example I using only 14 parts of polyethylene and increasing the amount of gilsonite to 28 parts.

EXAMPLE XVIII

Good results were obtained when the amount of polyethylene of Example I was increased to 34 parts and the amount of gilsonite to 21 parts.

EXAMPLE XIX

Good results were obtained using in the composition of Example I only 10 parts of gilsonite and increasing the amount of whiting to 10 parts and the amount of coal dust to 15 parts.

While there are given above certain specific examples of this invention and its application in practical use and also certain modifications and alternatives, it should be understood that these are not intended to be exhaustive or to be limiting of the invention. On the contrary, these illustrations and the explanations herein are given in order to acquaint others skilled in the art with this invention and the principles thereof and a suitable manner of its application in practical use, so that others skilled in the art may be enabled to modify the invention and to adapt it and apply it in numerous forms, each as may be best suited to the requirement of a particular use.

I claim:

1. A process which comprises blending together 20 to 60 parts of reclaimed rubber, 5 to 30 parts of gilsonite, and 12 to 50 parts of polyethylene to form a homogeneous composition, comminuting the approximate ratio of the reclaimed rubber to said substance being from 8:7 to 8:1, of the reclaimed rubber to said polyethylene being from 6:1 to 2:3, and of said polyethylene to said substance being greater than 1:5, and dispersing in an asphalt having a softening point of between about 100° F. and 230° F.

2. A process of embodying reclaimed rubber in asphalt which comprises providing in comminuted form a substantially homogeneous composition comprising from 20% to 60% of reclaimed rubber, from 5% to 30% of an asphaltic substance having a softening point of more than about 250° F. and a penetration of less than about 10 mm. at 77° F., and from 12% to 50% of a polyethylene having a density of from about 0.910 to about 0.941, the approximate ratio of the reclaimed rubber to said substance being from 8:7 to 8:1, of the reclaimed rubber to said polyethylene being from 6:1 to 2:3, and of said polyethylene to said substance being greater than 1:5, and incorporating the same into asphalt with heat and agitation.

3. A process of embodying reclaimed rubber in asphalt which comprises providing in comminuted form a substantially homogeneous composition comprising from 20% to 60% of reclaimed rubber, from 5% to 30% of an asphaltic substance having a softening point of from about 250° F. to about 350° F., and a penetration of less than about 10 mm. at 77° F., and from 12% to 50% of a polyethylene, the approximate ratio of the reclaimed rubber to said substance being from 8:7 to 8:1, of reclaimed rubber to said polyethylene being from 6:1 to 2:3, and of said polyethylene to said substance being greater than 1:5, and incorporating the same into asphalt with heat and agitation.

4. A process of embodying reclaimed rubber in asphalt which comprises blending a substantially homogeneous composition comprising from 20% to 60% of reclaimed rubber, from 5% to 30% of an asphaltic substance having a softening point of from about 250° F. to about 365° F. and a penetration of less than about 10 mm. at 77° F., and from 12% to 50% of a polyethylene, the approximate ratio of the reclaimed rubber to said asphaltic substance being from 8:7 to 8:1, of the reclaimed rubber to the polyethylene being from 6:1 to 2:3, and of the polyethylene to said asphaltic substance being greater than 1:5, and then comminuting and incorporating the same into asphalt wtih heat and agitation.

5. A process as in claim 1 wherein a mineral powder is also present in said composition.

6. A process as in claim 4 wherein, subsequent to the blending step and prior to the incorporation step the composition is formed into sheets and then flaked to a thickness of from about 0.003 to 0.008 of an inch and to an approximate size so that most of it will pass a 10-mesh screen.

7. A process as in claim 4 wherein said composition is provided in a form wherein the minimum dimension of at least 90% of the particles is not over about 0.012 of an inch.

8. A homogeneous composition for use in the incorporation of reclaimed rubber into asphalt having a softening point of less than about 230° F. comprising 20 to 60 parts of reclaimed rubber, 5 to 30 parts of an asphaltic substance having a softening point of more than about 250° F. and a penetration of less than about 10 mm., and 12 to 50 parts of polyethylene and being in substantially homogeneous comminuted form, the approximate ratio of the reclaimed rubber to said substance being from 8:7 to 8:1, of the reclaimed rubber to said polyethylene being from 6:1 to 2:3, and of said polyethylene to said substance being greater than 1:5.

9. A homogeneous composition for use in the incorporation of reclaimed rubber into asphalt comprising from 20 to 60 parts of reclaimed rubber, from 5 to 30 parts of gilsonite, and from 12 to 50 parts of polyethylene, the approximate ratio of the reclaimed rubber to said substance being from 8:7 to 8:1, of the reclaimed rubber to said polyethylene being from 6:1 to 2:3, and of said polyethylene to said substance being greater than 1:5.

10. A composition as in claim 9 which includes also from 5 to 40 parts of mineral powder.

References Cited

UNITED STATES PATENTS

| | | |
|---|---|---|
| 2,475,699 | 7/1949 | Derksen. |
| 2,807,596 | 9/1957 | Flickinger. |
| 2,918,940 | 12/1959 | Carr. |
| 3,144,423 | 8/1964 | Belak et al. |
| 3,154,508 | 10/1964 | Clelland. |
| 3,210,300 | 10/1965 | White _____ 260—889 |

FOREIGN PATENTS

| | | |
|---|---|---|
| 783,327 | 9/1957 | Great Britain. |

JULIUS FROME, *Primary Examiner.*

MORRIS LIEBMAN, *Examiner.*

B. A. AMERNICK, *Assistant Examiner.*

UNITED STATES PATENT OFFICE
CERTIFICATE OF CORRECTION

Patent No. 3,338,849                        August 29, 1967

Thomas A. Johnson

It is hereby certified that error appears in the above numbered patent requiring correction and that the said Letters Patent should read as corrected below.

Column 5, line 28, after "average" insert -- molecular --; column 7, line 3, for "4 1/2" read -- (4 1/2 --; line 55, for "EXAMPLE VII" read -- EXAMPLE VIII --; column 8, line 22, for "12,200" read -- 13,200 --; line 73, strike out "comminuting"; column 9, line 2, before "and" insert -- comminuting --.

Signed and sealed this 27th day of August 1968.

(SEAL)
Attest:

Edward M. Fletcher, Jr.                       EDWARD J. BRENNER
Attesting Officer                               Commissioner of Patents